US012098298B2

(12) United States Patent
Habibpour et al.

(10) Patent No.: US 12,098,298 B2
(45) Date of Patent: Sep. 24, 2024

(54) ULTRA-FAST UV-CURED MATERIAL FOR REPAIRING SURFACE IMPERFECTIONS

(71) Applicant: Illinois Tool Works Inc., Glenview, IL (US)

(72) Inventors: Mehdi Habibpour, Glenview, IL (US); Matt James Lertola, Glenview, IL (US); Grant Shouldice, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/467,799

(22) Filed: Sep. 7, 2021

(65) Prior Publication Data
US 2022/0073764 A1 Mar. 10, 2022

Related U.S. Application Data

(60) Provisional application No. 63/075,483, filed on Sep. 8, 2020.

(51) Int. Cl.
| | | |
|---|---|---|
| *C09D 7/63* | (2018.01) | |
| *C09D 5/03* | (2006.01) | |
| *C09D 7/40* | (2018.01) | |
| *C09D 7/61* | (2018.01) | |
| *C09D 7/65* | (2018.01) | |
| *C09D 167/00* | (2006.01) | |
| *C09D 175/16* | (2006.01) | |

(52) U.S. Cl.
CPC .............. *C09D 7/63* (2018.01); *C09D 5/033* (2013.01); *C09D 7/61* (2018.01); *C09D 7/65* (2018.01); *C09D 7/70* (2018.01); *C09D 167/00* (2013.01); *C09D 175/16* (2013.01)

(58) Field of Classification Search
CPC ... C09D 7/63; C09D 7/65; C09D 7/61; C09D 7/70; C09D 5/033; C09D 167/00; C09D 175/16
See application file for complete search history.

(56) References Cited

U.S. PATENT DOCUMENTS

| | | | |
|---|---|---|---|
| 6,716,891 B1 * | 4/2004 | Meisenburg | C09D 175/16 |
| | | | 428/419 |
| 9,884,460 B2 * | 2/2018 | Liddell | B05D 7/53 |
| 2004/0132843 A1 * | 7/2004 | Baumgart | C09D 175/16 |
| | | | 521/155 |
| 2016/0008848 A1 * | 1/2016 | Larson | B05D 3/067 |
| | | | 250/492.1 |
| 2018/0163102 A1 * | 6/2018 | Twardowska | B05D 7/14 |

FOREIGN PATENT DOCUMENTS

CN 102153899 B * 7/2014

OTHER PUBLICATIONS

English translation of CN-102153899.*

* cited by examiner

*Primary Examiner* — Robert S Walters, Jr.
(74) *Attorney, Agent, or Firm* — MaxGoLaw PLLC

(57) ABSTRACT

A method of sealing surface imperfections on a sanded surface of a repair to a vehicle body is provided that includes an uncured layer of a formulation being applied to sanded cured body filler on the vehicle body. The formulation includes a polyester resin, a crosslinking agent, a solvent, and a particulate filler. The uncured layer is exposed to actinic radiation to induce cure of the uncured layer to form a sealing coating. The resulting seal coating has able to seal surface imperfections. A surface imperfection sealing formulation is also provided that includes a polyester resin and a multifunctional crosslinking agent. A solvent is provided. A photoinitiator renders the formulation curable upon exposure to ultraviolet light exposure. A particulate filler is also present in an amount to result in a formulation with an uncured viscosity of between 2600 and 3000 centipoises.

9 Claims, No Drawings

ULTRA-FAST UV-CURED MATERIAL FOR REPAIRING SURFACE IMPERFECTIONS

RELATED APPLICATIONS

This application is a non-provisional application that claims priority benefit of U.S. Provisional Application Ser. No. 63/075,483 filed 9 Sep. 2021; the contents of which are hereby incorporated by reference.

FIELD OF THE INVENTION

The present invention in general relates to unsaturated curable formulation for vehicle body repair that cures rapidly compared to existing products, and in particular to curable formulation used in repairing imperfections on surfaces of auto-body repair coatings.

BACKGROUND OF THE INVENTION

Body filler compositions are used in the vehicle repair aftermarket industry to repair deformities such as holes and dents in vehicle bodies. The filler composition cures following application to the deformity and upon reaching a level of hardness, the resulting coating overlying the defect is sanded and finished with suitable painting steps to affect the repair of the vehicle body.

When a thick layer filler material is applied to damaged areas such as dents, defected areas, and holes on automotive body parts, it is cured and then shaped by sanding. During the sanding, pockets of air trapped during application of the coating layer are exposed, which leave a surface with small imperfections such as pinholes. Microspheres within the composition can also be broken during sanding creating a separate basis pin holes in the surface.

These imperfections are conventionally covered and filled with a subsequent thin layer of polymer composite material called pinhole eliminator to fill the imperfections so subsequent primer and paint layers achieve the class A, high sheen surface finish common to exterior, new vehicle surfaces. An important aspect of these compositions is a viscosity that allows the applied materials to flow into the surface imperfections such as pinholes The limiting factor in the conventional pinhole removing materials is their slow rate of drying, which involves volatilization of the solvent in the composite before the polymer content dries out. U.S. Pat. No. 9,884,460 B2 is exemplary of such methods.

Still other conventional methods of attending to sanding created pin holes include several steps and are time consuming. For conventional methods, a liquid or paste sealer is dispensed onto an applicator, such as a squeegee or a spreader knife. The applicator is then used to wipe the sealer onto the porous surface. This method usually results in an excess film build of the sealer which must be removed before the next step in the process. The excess material is removed by wiping and sanding the residue.

Conventional surface pinhole defect repair compositions rely on a drying mechanism for hardening the material that fills imperfections on the surface. This drying mechanism is both a time-consuming process and also develops a surface tack within a few minutes after application thereby limiting the working time so as to make it difficult to correct errors and otherwise reworking the composition in advance of cure or hardening.

Thus, there exists a need for improved compositions that address the limitations of the prior art through resort to a one part, UV curable composition. There further exists a need for a method of using such a composition that is rapidly UV curable to fill and seal surface imperfections such as pinholes while still having a long working time yet is quickly cured by exposure to a UV light source, compared to conventional pinhole defect repair systems.

SUMMARY OF THE INVENTION

A method of sealing surface imperfections on a sanded surface of a repair to a vehicle body is provided that includes an uncured layer of a formulation being applied to sanded cured body filler on the vehicle body. The formulation includes a polyester resin, a crosslinking agent, a solvent, and a particulate filler. The uncured layer is exposed to actinic radiation to induce cure of the uncured layer to form a sealing coating. The resulting seal coating is able to seal surface imperfections.

A surface imperfection sealing formulation is also provided that includes a polyester resin and a multifunctional crosslinking agent. A solvent is provided. A photoinitiator renders the formulation curable upon exposure to ultraviolet light exposure. A particulate filler is also present in an amount to result in a formulation with an uncured viscosity of between 2600 and 3000 centipoises.

DETAILED DESCRIPTION OF THE PREFERRED EMBODIMENTS

The present invention has utility as an ultraviolet (UV) light curable formulation that is well suited for sealing surface imperfections such as pinholes, pits, and scratches prior to overcoating with substances functioning as topcoats, primers, or paints. The present invention affords a user advantages in terms of reduced overall repair time without compromising the working time after uncured inventive composition has been applied to a target surface. The uncured inventive composition flows to fill imperfections in surface. By transforming the application method from conventional air drying to UV-curing, the length of the surface repair process in total drops from approximately 15 minutes for conventional material to only 1 to 5 minutes using an inventive composition. Additionally, the present invention retains working time is also improved and contrary to drying materials, the UV-cured material can be removed, reworked, and errors can be corrected after application to the target surface and prior to UV cure.

Embodiments of the inventive compositions provide fast curing surface imperfection correction utilizing photo polymerization reactions using a variety of light sources such as low energy consuming and environmentally-friendly ultraviolet light emitting diode (UV-LED) and sunlight. Absent UV exposure, an inventive composition has a working time that is longer than conventional surface defect repair systems yet cures more rapidly upon UV exposure thereby offering a user a controlled working time and a rapid cure thereafter. As a result, the applied material can be corrected or reworked without the conventional problem of viscosity build. Also, the UV cure of the inventive formulation reduces temperature dependency of cure rates compared to conventional surface defect repair systems.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

Table 1 lists the major components of an embodiment of the inventive curable composition.

TABLE 1

Formulation of a UV curable vehicle body repair composition

| Ingredient | Typical Total Weight Percent | Preferred Total Weight Percent |
|---|---|---|
| Polyester resin | 10-60 | 23-48 |
| Aliphatic urethane acrylate resin | 0-20 | 0-5 |
| Crosslinking agent | 0-30 | 0.1-8.2 |
| Photoinitiator | 0.1-5 | 0.1-1.5 |
| Solvent | 5-40 | 9.7-14 |
| Additives | 0.5-5 | Each: 1-3 |
| Filler (e.g. pigment, talc, microspheres) | Remainder | Remainder |

An inventive polyester resin has a degree of ethylenic unsaturation that is between 20 and 100% of the non-alcoholic monomer in the polyester resin and denotes reactivity within the polyester resin backbone to free radical polymerization. The unsaturation in a polyester backbone is reactive with vinyl and allyl moieties of a styrenic or non-styrenic molecule through free-radical polymerization.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether.

An inventive unsaturated polyester is readily formed in a single reaction or in multi-stage reactions. Typical reaction temperatures range from 130-240° C. A conventional esterification catalyst is present and illustratively includes acids, transition metal catalysts and organo-tin compounds. Typical catalyst loadings range from 0.01 to 1 total weight percent of the reactants.

Reactive polyester resins used in a formulation for repairing imperfections on surfaces of auto-body repair coatings have a weight average molecular average weight ranging from 5,000 to 600,000. For purposes of calculating monomer percent, reactive diluents are omitted. Based polyester resin formulations operative herein are detailed in Table 1.

To form a formulation for repairing imperfections on surfaces of auto-body repair coatings, the resulting reactive polyester resin is dissolved in a multifunctional reactive diluent. Reactive diluents operative herein include acrylics, acrylates, and methacrylates such as methyl methacrylate, butyl acrylate, ethyl-hexyl acrylate, hydroxypropyl methacrylate, hydroxethyl methacrylate, lauryl acrylate, stearyl methacrylate, lauryl methacrylate, butanediol diacrylate, ethyleneglycol dimethacrylate, ethyleneglycol-DCPD methacrylate, ethyl(meth)acrylate and n- and isobutyl(meth)acrylate, cyclohexyl(meth)acrylate, isobornyl(meth)acrylate, benzyl(meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure ($C_1$-$C_6$ alkyl)-O—($C_2$-$C_6$ alkylene) such as ethyl vinyl ether, or methyl vinyl; styrene, α-methylstyrene, vinyl toluene, di-functional styrene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

An actinic radiation curable resin is also present in some embodiments of an inventive composition in the form of an aliphatic urethane acrylate oligomer or polymeric resin. Such resins are readily formed from polyether polyol, a diisocyanate and hydroxyethyl acrylate. The resin typically has a number average molecular weight of 1,000 to 20,000 Daltons. Diisocyanates operative herein illustratively include dicyclohexyl methane diisocyanate, isophorone diisocyanate. It is appreciated that aliphatic urethane acrylate resins are typically sold commercially as a 60 to 85% by weight in a diluent such as trimethylolpropane triethoxy triacrylate, pentaerythritol tri/tetracrylate, or the like. Still other actinic radiation curable resins operative herein are detailed in U.S. Pat. No. 5,908,873.

A crosslinking agent that is multifunctional is also present in an inventive composition. As used herein, multifunctional is defined as a compound that has a polymerizable functionality of at least 2. Difunctional crosslinking agents are particularly well suited for use in the present invention. Crosslinking agents operative in the present invention illustratively include diallyl fumarate, diallyl diglycol carbonate, allyl methacrylate, isobornyl acrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, dipropylene glycol diacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl) propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[4-(vinyloxy)butyl]succinate, bis((4-((vinyloxy)methyl)cyclohexyl)methyl)isophthalate, bis(4-(vinyloxy)butyl)terephthalate, bis[[4-[(vinyloxy)methyl]cyclohexyl]methyl]terephthalate, bis[4-(vinyloxy)butyl]adipate, bis[4-(vinyloxy)butyl](methylenedi-1,4-phenylene)biscarbamate, bis-[4-(vinyloxy)butyl](4-methyl-1,3-phenylene)biscarbamate, bis[4-(vinyloxy)butyl]1,6-hexanediylbiscarbamate, tris[4-(vinyloxy)butyl]trimellitate or combinations thereof. It is appreciated that a minority amount of trifunctional or higher functional crosslinking agent present modifies the cured coating properties. It is appreciated that a reactive diluent, the crosslinking agent, or the combination thereof are operative curing and also serves to render the composition of a viscosity sufficiently low to flow and fill the surface imperfections such as pinholes and surface marring under ambient temperature and pressure application conditions of Standard Temperature and Pressure (STP).

In order to achieve enhanced rates of actinic cure, a photoinitiator is present from 0.1 to 5 total weight percent. Bisacylphosphine oxides (BAPO) are exemplary of a photoinitiator operative in the present invention. Specific bisacylphosphine oxides operative herein illustratively in phenyl bis(2,4,6-trimethylbenzoyl)-phosphine oxide, diphenyl(2,4,6-trimethylbenzoyl) phosphine oxide, bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-ethoxyphenylphosphine oxide, bis-(2,6-dichlorobenzoyl)-4-biphenylylphosphine oxide, bis-(2,6-dichlorobenzoyl)-4-propylphenylphosphine oxide, bis-(2,6-dichlorobenzoyl)-2-naphthylphosphine oxide, bis-(2,6-dichlorobenzoyl)-1-napthylphosphine oxide, bis-(2,6-dichlorobenzoyl)-4-chlorophenylphosphine oxide, bis-(2,6-dichlorobenzoyl)-2,4-dimethoxyphenylphosphine oxide, bis-(2,6-dichlorobenzoyl) decylphosphine oxide, bis-(2,6-dichlorobenzoyl)-4-octylphenylphosphine oxide, bis-(2,6-dimethoxybenzoyl)-2,5-dimethylphenylphosphine oxide bis-(2,6-dimethoxybenzoyl)phenylphosphine oxide, bis-(2,4,6-trimethylbenzoyl)-2,5-dimethylphenylphosphine oxide, bis-(2,6-dichloro-3,4,5-trimethoxybenzoyl)-2,5-dimethylphenylphosphine oxide, bis-(2,6-dichloro-3,4,5-trimethoxybenzoyl)-4-ethoxyphenylphosphine oxide, bis-(2-methyl-1-naphthoyl)-2,5-dimethylphenylphosphine oxide, bis-(2-methyl-1-naphthoyl)phenylphosphine oxide, bis-(2-methyl-1-naphthoyl)-4-biphenylphosphine oxide, bis-(2-methyl-1-naphthoyl)-4-ethoxyphenylphosphine oxide, bis-(2-methyl-1-naphthoyl)-2-naphthylphosphine oxide, bis-(2-methyl-1-naphthoyl)-4-propylphenylphosphine oxide, bis-(2-methyl-1-naphthoyl)-2,5-dimethylphosphine oxide, bis-(2-methoxy-1-naphthoyl)-4-ethoxyphenylphosphine oxide, bis-(2-methoxy-1-naphthoyl)-4-biphenylylphosphine oxide, bis-(2-methoxy-1-naphthoyl)-2-naphthylphosphine oxide, bis-(2-chloro-1-naphthoyl)-2,5-dimethylphenylphosphine oxide, and combinations thereof. In some inventive embodiments, liquid blends of photoinitiators are provided by dissolving solid bisacylphosphine oxide photoinitiator in another liquid photoinitiator or a photoinitiator blend which is of liquid form.

To further control viscosity and while not intending to be bound by theory, it is believed that solvents can be effective as a dispersive vehicle for the fillers and resins in an inventive formulation prior to curing. In some inventive embodiments, the formulation has a viscosity of between 2850 and 3570 Centistokes at standard temperature and pressure. During the application of the formulation, solvents aid in achieving an appropriate viscosity of the formulation. However, after the coating has been cured, it can be expected that there is no residual solvent. Solvents operative herein illustratively include 2-butoxyethanol, ethylene glycol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one. In some inventive embodiments, the solvent is or includes as a constituent hydrocarbons regardless of saturation; alcohols such as alkoxy alcohols, and ketonic alcohols; ketones; esters, such as acetates; glycol ethers; and glycol ether esters; subject to the proviso that the solvent has a molecular weight of less than 300 Daltons. Examples of hydrocarbons operative herein illustratively include toluene, xylene, naphtha, petroleum distillates, ethyl benzene, trimethyl benzenes, and fractions of hydrocarbon mixtures obtained from petroleum refineries. Alcohols operative herein illustratively include ethanol, n-propanol, iso-propanol, n-butanol, iso-butanol, benzyl alcohol, 2-(n-propoxy) ethanol, 2-(n-butoxy) ethanol, 3-(n-propoxy) ethanol, and 2-phenoxyethanol. Ketones operative herein illustratively include acetone, methyl ethyl ketone, methyl n-propyl ketone, methyl n-butyl ketone, and methyl isoamyl ketone. Esters operative herein illustratively include ethyl propanoate, ethyl butanoate, ethyl glycolate, propyl glycolate, butyl glycolate, and isoamyl glycolate, methyl acetate, ethyl acetate, n-butyl acetate, isoamyl acetate, and t-butyl acetate. Mixtures of any two or more of these solvents may also be utilized. Mixtures of miscible combinations of any of the aforementioned are also appreciated to be operative herein. Solvent is typically present in an inventive formulation from 5 to 40 weight percent.

Several additives are readily included in an inventive formulation that illustratively include light and heat stabilizers to maintain clarity of the cured adhesives, adhesion promoters, flow control additives, pigments and dyes and combinations thereof. Generally, each of the aforementioned additives is independently present from 0.5 to 5 total weight percent.

Filler particulates or fibers operative in the present invention illustratively include talc, alumina trihydrate, calcium sulfate, calcium carbonate, magnesium sulfate, magnesium carbonate, barium sulfate, microspheroids and the like. A filler is present from zero to the remainder total weight percent of a complete formulation for application to a substrate, with a typical upper limit being 70 total weight percent. It is appreciated that a pigment and filler can have the same function and in those instances where both are present in a formulation, the amounts of both are cumulative.

As used herein a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microspheroid typically has a longest linear dimension of between 20 and 100 microns to improve sandability and reduce density.

It is appreciated that the composition is readily reapplied as many times as necessary, either before or after initiation of cure to fill surface imperfections.

The UV radiation necessary for curing can be provided from several sources, including mercury arc lamps and UV-light emitting diodes (UV-LED). Because of the lower consumption of energy, and reduced heating of the substrate, UV-LED curing is often a preferred actinic radiation source for curing relative to a mercury arc lamp. The UV-LED bulbs do not generate ozone, in contrast to the typical UV-bulbs, require less energy, and exhibit a longer lifetime. The absence of mercury also promotes ease of disposal. UV LEDs emissions of 365 nm, 385 nm, 395 nm, and 405 nm, are each alone or in combination suitable for inducing cure of an inventive formulation. Typical rates of cure for an inventive composition are 0.3 to 2 minutes for 1 mm thick composition.

The present invention is further detailed with respect to the following non limiting examples. These examples are not intended to limit the scope of the invention but rather highlight properties of specific inventive embodiments and the superior performance thereof relative to comparative examples.

EXAMPLES

Example 1

An inventive composition is provided based on a polyester resin (33 total weight percent), aliphatic urethane acrylate resin (5 total weight percent), a crosslinking agent of dipropylene glycol diacrylate (8.2 total weight percent), a TPOL photoinitiator (CAS: 84434-11-7, 0.8 total weight percent), solvent (12.8 total weight percent), and the remainder being equal amounts of 5 micron calcium carbonate and 24 micron solid ethylvinyl acetate polymer microspheroids. The inventive composition flowed onto a pinhole covered surface to a thickness of 1 mm after exposure to actinic radiation from a UV-LED at 395 nm for 40 second, the sanded substrate with an inventive cured coating had an arithmetic average of the absolute values of the profile height deviations from the mean line that was reduced by 93%, as compared to the uncoated substrate, per ASME B46.1.

Example 2

The process of Example 1 is repeated with the aliphatic urethane acrylate resin present at 10 total weight percent instead of 5 total weight percent of Example 1. A similar cure profile results.

Example 3

The process of Example 1 is repeated with the polyester resin present at 25 total weight percent instead of 33 total weight percent of Example 1. A similar cure profile results.

Example 4

The process of Example 1 is repeated with the hexane dial diacrylate present at 2 total weight percent instead of dipropylene glycol diacrylate at 8.2 total weight percent of Example 1. A similar cure profile results.

COMPARATIVE EXAMPLES

The process of Example 1 is repeated without aliphatic urethan acrylate and dipropylene glycol diacrylate and the amount of the polyester resin increased by 14 total weight percent. The resulting layer was tacky at surface and the cure was incomplete.

The process of Example 1 is repeated without TPOL photoinitiator. The coated layer did not cure.

The process of Example 1 is repeated without dipropylene glycol diacrylate and styrene was added at 8.2 total weight percent. The coated layer did not fully cure and the surface was tacky.

The process of Example 1 is repeated with polyester resin present at 25 total weight percent and aliphatic urethane acrylate present at 5 total weight percent and 24 micron solid ethylvinyl acetate polymer microspheroids present at 26 total weight percent. The resulting cured surface is rough.

These examples demonstrate the processes to be claimed in this patent filing. It should be remarked that other additions and modifications as known in the art are also expected to be covered.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A method of sealing surface imperfections on a sanded surface repairing a vehicle body comprising:
   flow applying an uncured layer of a formulation consisting of: a polyester resin, an optional aliphatic urethane acrylate oligomer or polymer; a photoinitiator only activated in response to actinic radiation to induce cure; a crosslinking agent, a solvent in which said polyester resin and said crosslinking agent are soluble, and a particulate filler selected from the group consisting of: talc, alumina trihydrate, calcium sulfate, calcium carbonate, magnesium sulfate, magnesium carbonate, barium sulfate, and microspheroids, the formulation applied to a sanded cured body filler on the vehicle body, said polyester resin terminally functionalized with allyl glycidyl ether, glycidyl methacrylate, trimethylolpropane diallyl ether, allyl pentaerythritol or polymeric allyl glycidyl ether; and said crosslinking agent selected from the group consisting of diallyl fumarate, diallyl diglycol carbonate, allyl methacrylate, isobornyl acrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, dipropylene glycol diacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl)phosphate, 2,2-bis(4-methacryloxyphenyl) propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[4-(vinyloxy)butyl]succinate, bis((4-((vinyloxy)methyl)cyclohexyl)methyl) isophthalate, bis(4-(vinyloxy)butyl)terephthalate, bis [[4-[(vinyloxy)methyl]cyclohexyl]methyl] terephthalate, bis[4-(vinyloxy)butyl]adipate bis[4-(vinyloxy)butyl](methylenedi-1,4-phenylene) biscarbamate, bis-[4-(vinyloxy)butyl](4-methyl-1,3-phenylene)biscarbamate, bis[4-(vinyloxy)butyl]1,6-hexanediylbiscarbamate, tris[4-(vinyloxy)butyl] trimellitate or combinations thereof and the uncured formulation having a viscosity of between 2850 and 3570 Centistokes at standard temperature and pressure; and
   exposing the uncured layer only to actinic radiation to induce cure of the uncured layer to form a sealing coating.

2. The method of claim 1 further comprising applying an overlayer of a primer or paint on the coating.

3. The method of claim 1 wherein the actinic radiation is emission from an ultraviolet light emitting diode.

4. The method of claim 1 wherein the exposing is from 30 seconds to 1 minute.

5. A surface imperfection sealing formulation consisting of:
- a polyester resin terminally functionalized with allyl glycidyl ether, glycidyl methacrylate, trimethylolpropane diallyl ether, allyl pentaerythritol or polymeric allyl glycidyl ether;
- an optional aliphatic urethane acrylate oligomer or polymer;
- a multifunctional crosslinking agent selected from the group consisting of diallyl fumarate, diallyl diglycol carbonate, allyl methacrylate, isobornyl acrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, dipropylene glycol diacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl) propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl] glutarate, bis[4-(vinyloxy)butyl]succinate, bis((4-((vinyloxy)methyl)cyclohexyl)methylisophthalate, bis (4-(vinyloxy)butyl)terephthalate, bis[[4-[(vinyloxy) methyl]cyclohexyl]methyl]terephthalate, bis[4-(vinyloxy)butyl]adipate bis[4-(vinyloxy)butyl] (methylenedi-1,4-phenylene)biscarbamate, bis-[4-(vinyloxy)butyl](4-methyl-1,3-phenylene) biscarbamate, bis[4-(vinyloxy)butyl]1,6-hexanediylbiscarbamate, tris[4-(vinyloxy)butyl] trimellitate or combinations thereof;
- a solvent in which said polyester resin and said crosslinking agent are soluble;
- a photoinitiator only activated in response to actinic radiation to induce cure; and
- a particulate filler selected from the group consisting of: talc, alumina trihydrate, calcium sulfate, calcium carbonate, magnesium sulfate, magnesium carbonate, barium sulfate, and microspheroids;
- at least one optional additive of a light stabilizer, a heat stabilizer, an adhesion promoter, a flow control additive, a pigment, a dye, or combinations of any of the aforementioned; and
- wherein the formulation has an uncured viscosity of between 2850 and 3570 centipoises at standard temperature and pressure.

6. The formulation of claim 5 wherein said multifunctional crosslinking agent is difunctional.

7. The formulation of claim 5 wherein said multifunctional crosslinking agent is a diacrylate.

8. The formulation of claim 5 wherein said multifunctional crosslinking agent is present from 0 to 30 total weight percent.

9. The formulation of claim 5 wherein each of the said at least one optional additives is independently present from 0.5 to 5 total weight percent.

* * * * *